US011143264B2

(12) United States Patent
Aoki

(10) Patent No.: US 11,143,264 B2
(45) Date of Patent: Oct. 12, 2021

(54) CYLINDER APPARATUS

(71) Applicant: HITACHI AUTOMOTIVE SYSTEMS, LTD., Ibaraki (JP)

(72) Inventor: Yasuhiro Aoki, Yokohama (JP)

(73) Assignee: HITACHI ASTEMO, LTD., Ibaraki (JP)

(*) Notice: Subject to any disclaimer, the term of this patent is extended or adjusted under 35 U.S.C. 154(b) by 9 days.

(21) Appl. No.: 16/494,851

(22) PCT Filed: Mar. 13, 2018

(86) PCT No.: PCT/JP2018/009603
§ 371 (c)(1),
(2) Date: Sep. 17, 2019

(87) PCT Pub. No.: WO2018/180433
PCT Pub. Date: Oct. 4, 2018

(65) Prior Publication Data
US 2020/0284313 A1 Sep. 10, 2020

(30) Foreign Application Priority Data
Mar. 30, 2017 (JP) .............................. JP2017-068009

(51) Int. Cl.
F16F 9/346 (2006.01)
F16F 9/46 (2006.01)
(Continued)

(52) U.S. Cl.
CPC .................. F16F 9/46 (2013.01); F16F 9/34 (2013.01); F16F 9/53 (2013.01); B60G 13/08 (2013.01);
(Continued)

(58) Field of Classification Search
CPC ...... B60G 13/08; B60G 17/016; B60G 17/08; F16F 9/062; F16F 9/34; F16F 9/346; F16F 9/46; F16F 9/48; F16F 9/532
(Continued)

(56) References Cited

U.S. PATENT DOCUMENTS 4,298,101 A * 11/1981 Dressell, Jr. .............. F16F 9/48
188/285
5,000,299 A * 3/1991 Goto .................. C10M 171/001
188/267.1
(Continued)

FOREIGN PATENT DOCUMENTS

JP 6-174002 6/1994
WO 2014/135183 9/2014

OTHER PUBLICATIONS

Written Opinion of the International Searching Authority dated May 15, 2018 in International (PCT) Application No. PCT/JP2018/009603.
(Continued)

Primary Examiner — Christopher P Schwartz
(74) Attorney, Agent, or Firm — Wenderoth, Lind & Ponack, L.L.P.

(57) ABSTRACT

Electrorheological fluid is loaded in a shock absorber 1 as hydraulic fluid 2. The shock absorber 1 controls a generated damping force by producing a potential difference in an electrode passage 19 to thus change viscosity of electrorheological fluid flowing in the electrode passage 19. A plurality of partition walls 20 is provided in the electrode passage 19 formed between an inner tube 3 and an electrode tube 18. Due to this configuration, a plurality of helical flow passages 24 is formed in the electrode passage 19. In this case, the flow passages 24 are each provided with a flow passage cross-sectional area change portion that allows the flow passage 24 to have a larger cross-sectional area on one side
(Continued)

spaced apart from an entrance 24A1 side (an intermediate region F) at least compared to the entrance 24A1 side of the extension-side flow passage 24 (an inflow region E).

7 Claims, 8 Drawing Sheets

(51) Int. Cl.
*F16F 9/34* (2006.01)
*F16F 9/53* (2006.01)
*B60G 13/08* (2006.01)

(52) U.S. Cl.
CPC .... *B60G 2500/10* (2013.01); *F16F 2224/043* (2013.01); *F16F 2230/24* (2013.01)

(58) Field of Classification Search
USPC ................... 188/266, 266.7, 267, 267.1, 315
See application file for complete search history.

(56) References Cited

U.S. PATENT DOCUMENTS

| | | | | |
|---|---|---|---|---|
| 5,161,653 | A | * | 11/1992 | Hare, Sr. ................ F16F 9/532 137/514.3 |
| 5,259,487 | A | * | 11/1993 | Petek ...................... F16F 9/532 188/267.1 |
| 2016/0059656 | A1 | * | 3/2016 | Funke ..................... F16F 9/062 188/267.1 |
| 2018/0051766 | A1 | * | 2/2018 | Yamagai ............... F16F 9/3235 |
| 2018/0094690 | A1 | * | 4/2018 | Tanabe ..................... F16F 9/53 |
| 2020/0102998 | A1 | * | 4/2020 | Aoki ....................... F16F 9/369 |

OTHER PUBLICATIONS

International Search Report dated May 15, 2018 in International (PCT) Application No. PCT/JP2018/009603.

* cited by examiner

CYLINDER APPARATUS

TECHNICAL FIELD

The present invention relates to a cylinder apparatus preferably used to absorb a vibration of a vehicle such as an automobile and a railway train.

BACKGROUND ART

Generally, a vehicle such as an automobile is provided with a cylinder apparatus represented by a hydraulic shock absorber between a vehicle body (sprung) side and each wheel (unsprung) side. Then, PTL 1 discloses such a configuration that a damper (shock absorber) using electrorheological fluid as working fluid thereof is provided with helical members between an inner tube and an electrode tube (an intermediate tube), and a portion between the helical members is used as a flow passage.

CITATION LIST

Patent Literature

[PTL 1] International Publication No. 2014-135183

SUMMARY OF INVENTION

Technical Problem

Then, a cylinder apparatus disclosed in PTL 1 can further increase a maximum damping force by setting a small angle between the helical members to thus secure a length of the flow passage. However, setting the small angle between the helical members leads to a large change in a flow direction of the electrorheological fluid at an entrance of the flow passage, thereby raising a possibility of disturbing a flow of the hydraulic fluid and thus making a damping force characteristic unstable. Further, reducing the angle between the helical members leads to a reduction in a pitch between the helical members and a reduction in an opening area of the flow passage, thereby raising a possibility of unintentionally increasing a minimum damping force and making it excessive for a desired value.

An object of the present invention is to provide a cylinder apparatus capable of acquiring a stable damping force characteristic and also maintaining a damping force variable range.

Solution to Problem

According to one aspect of the present invention, a cylinder apparatus includes functional fluid sealingly contained in this cylinder apparatus and having a fluid property changing according to an electric field, and a rod inserted inside this cylinder apparatus. The cylinder apparatus includes an inner tube electrode and an outer tube electrode that are electrodes having different potentials from each other. The outer tube electrode is provided outside the inner tube electrode. The cylinder apparatus includes a flow passage formed between the inner tube electrode and the outer tube electrode. The flow passage is configured in such a manner that the functional fluid flows from one axial end side toward the other axial end side due to at least an extension-side movement of the rod. The flow passage is provided with a flow passage cross-sectional area change portion configured to allow the flow passage to have a larger cross-sectional area on one side spaced apart from an entrance side at least compared to the entrance side of an extension-side flow passage.

The cylinder apparatus according to the one aspect of the present invention can acquire the stable damping force characteristic and also curve the increase in the soft damping force while maintaining the damping force variable range.

DESCRIPTION OF EMBODIMENTS

In the following description, a cylinder apparatus according to an embodiment of the present invention will be described with reference to the accompanying drawings based on an example in which the cylinder apparatus is applied to a shock absorber mounted on a vehicle such as a four-wheeled automobile.

Figure 1:
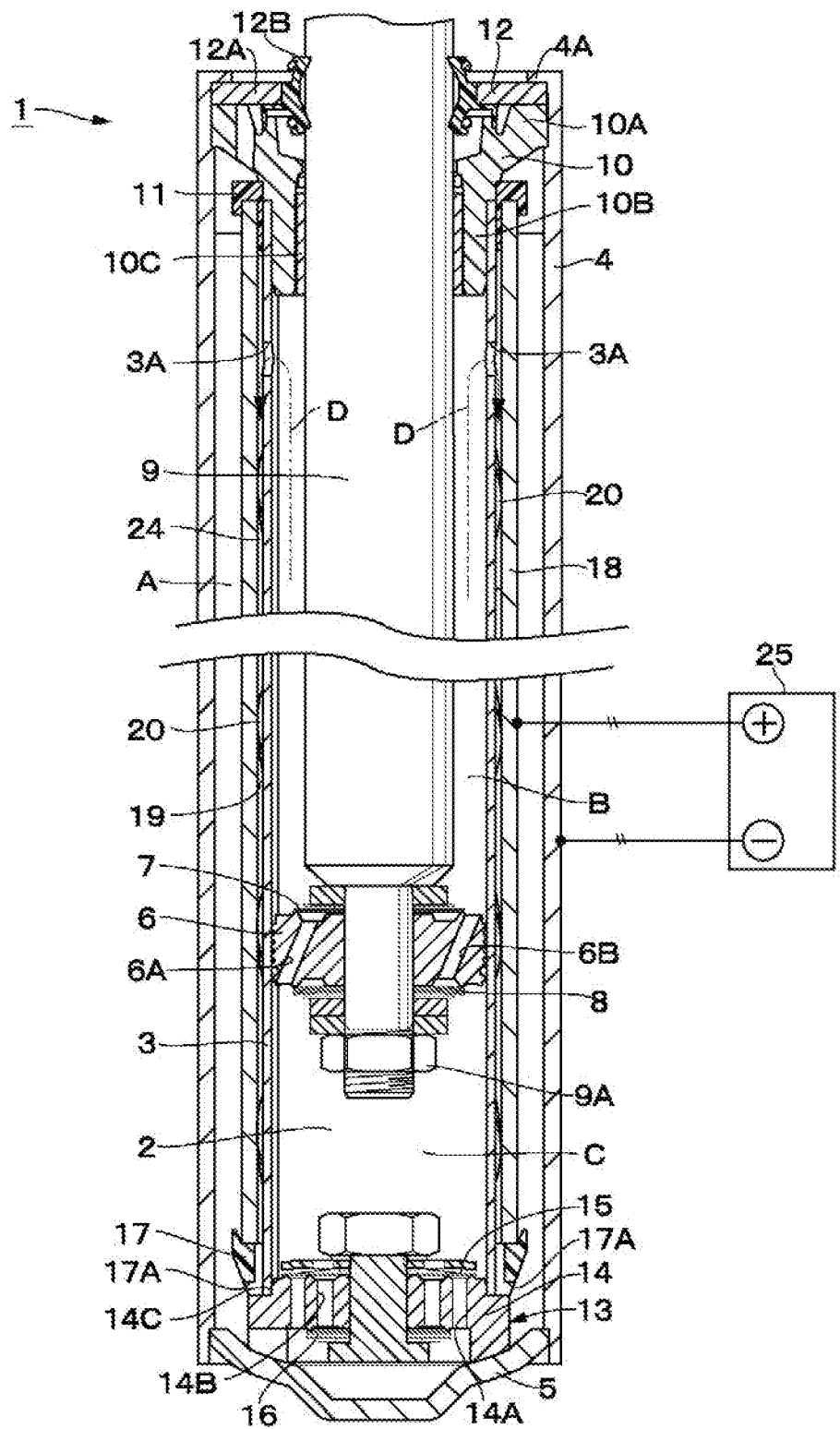
FIG. 1 is a vertical cross-sectional view illustrating a shock absorber as a cylinder apparatus according to an embodiment.
Figure 2:
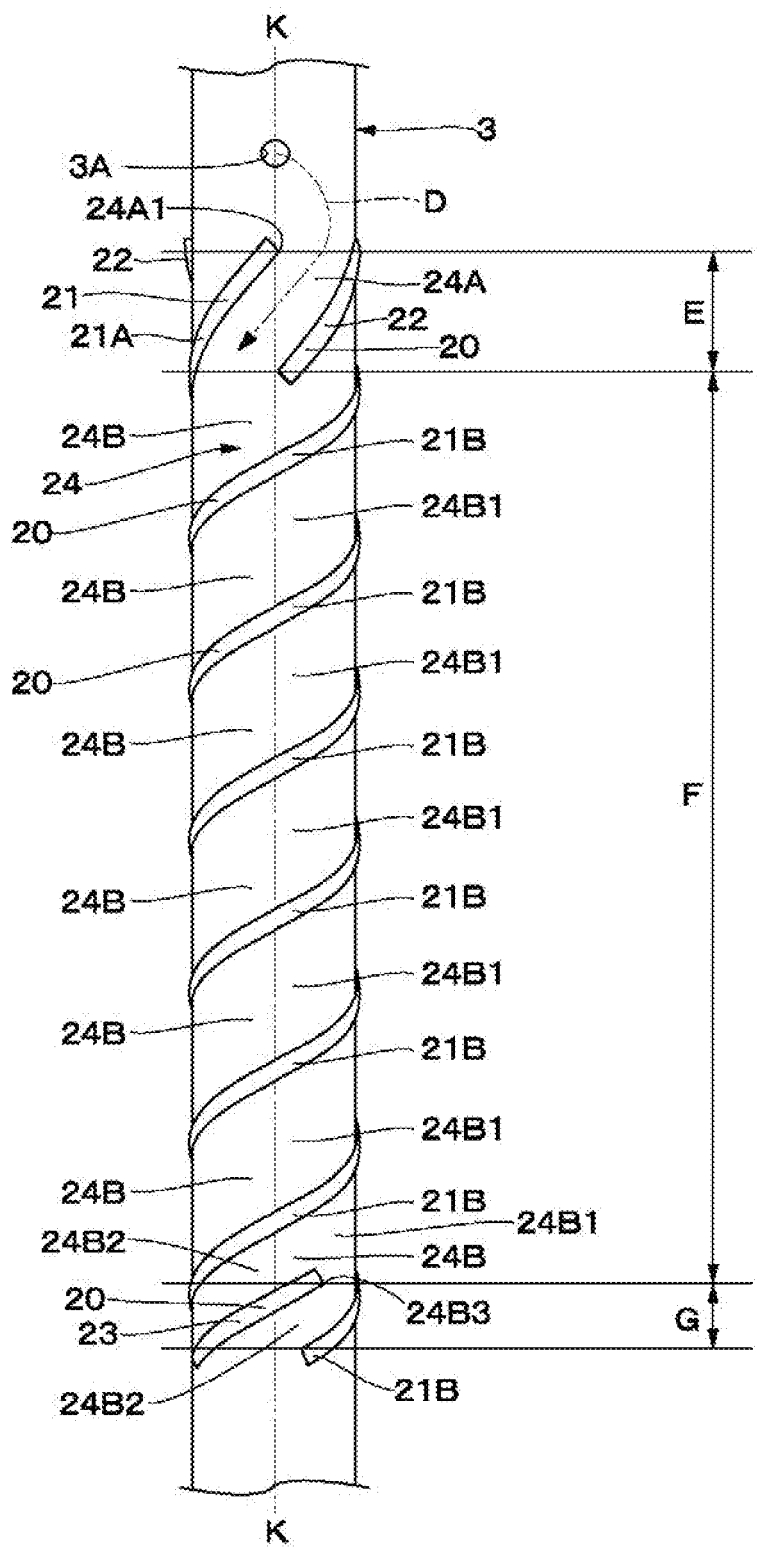
FIG. 2 is a front view, illustrating an inner tube and seal portions (partition walls).
Figure 3:
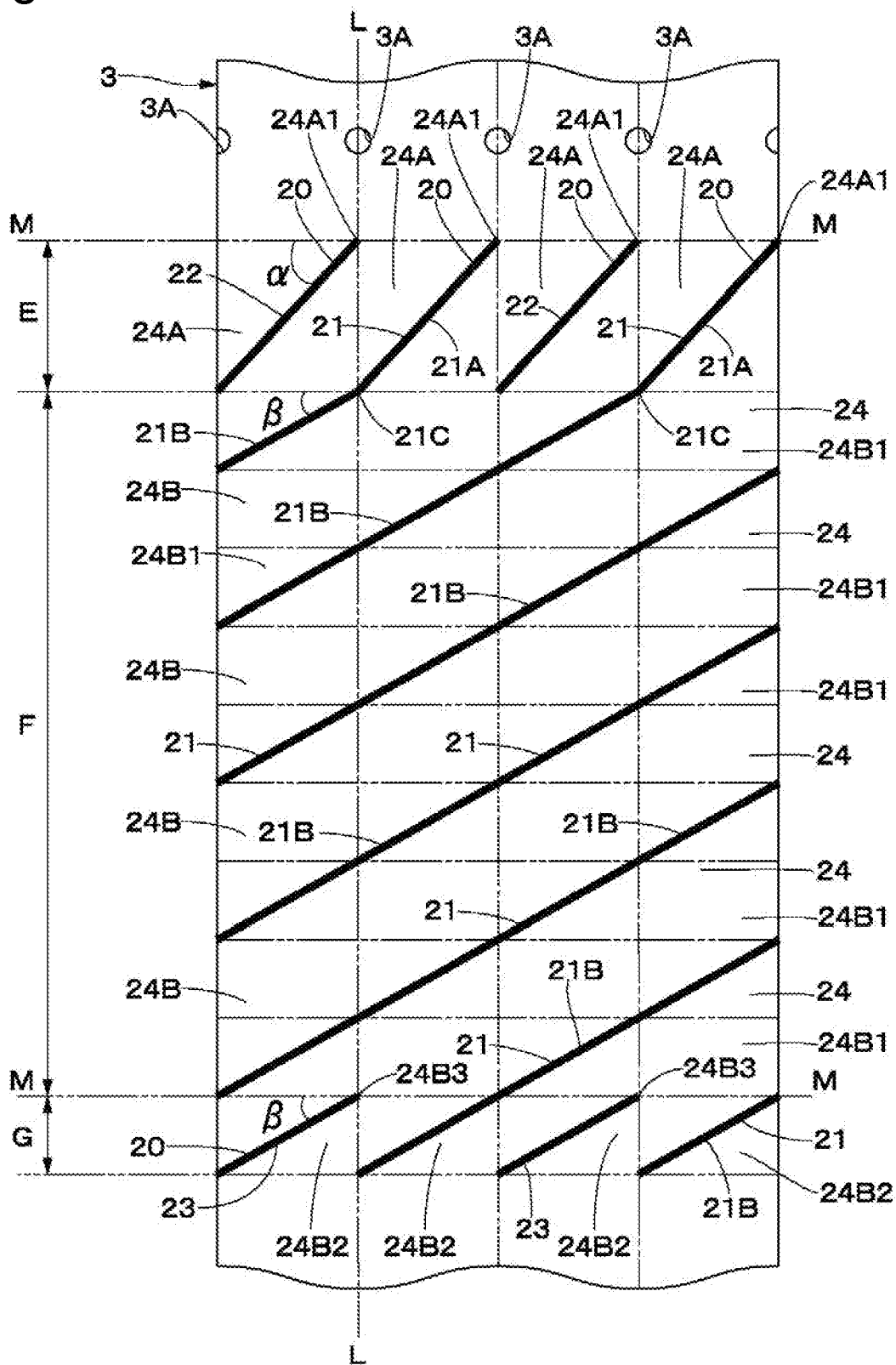
FIG. 3 illustrates the inner tube and the seal portions in a developed manner.

FIGS. 1 to 3 illustrate an embodiment of the present invention. In FIG. 1, a shock absorber 1 as a cylinder apparatus is configured as a damping force adjustable hydraulic shock absorber (a semi-active damper) using functional fluid (i.e., electrorheological fluid) as hydraulic fluid 2 such as hydraulic oil sealingly contained in the shock absorber 1. The shock absorber 1 forms a suspension apparatus for the vehicle together with, for example, a suspension spring (not illustrated) embodied by a coil spring. In the following description, the shock absorber 1 will be described assuming that one axial end side and the other axial end side of the shock absorber 1 refer to an "upper end" side and a "lower end" side, respectively, but the one axial end side and the other axial end side of the shock absorber 1 may be the "lower end" side and the "upper end" side, respectively.

The shock absorber 1 includes an inner tube 3, an outer tube 4, a piston 6, a piston rod 9, a bottom valve 13, an electrode tube 18, and the like. The inner tube 3 is formed as an axially extending cylindrical tube member, and sealingly contains therein the hydraulic fluid 2, which is the functional fluid. Further, the piston rod 9 is inserted inside the inner tube 3, and the outer tube 4 and the electrode tube 18 are coaxially provided outside the inner tube 3. In the present embodiment, the inner tube 3 and the electrode tube 18 are set as an inner tube electrode and an outer tube electrode, respectively.

The inner tube 3 has a lower end side fittedly attached to a valve body 14 of the bottom valve 13 and an upper end side fittedly attached to a rod guide 10. On the inner tube 3, a plurality of (for example, four) oil holes 3A, which is in constant communication with an electrode passage 19, is formed so as to be spaced apart circumferentially as radial horizontal holes. In other words, a rod-side oil chamber B in the inner tube 3 is in communication with the electrode passage 19 via the oil holes 3A. Further, partition walls 20, which will be described below, are provided so as to be helically wound around on an outer peripheral side of the inner tube 3.

The outer tube 4 forms an outer shell of the shock absorber 1, and is formed as a cylindrical member. The outer tube 4 is provided externally around the inner tube 3 and the electrode tube 18, and forms a reservoir chamber A in communication with the electrode passage 19 between the outer tube 14 and this electrode tube 18. In this case, the outer tube 4 has, on a lower end side thereof, a closed end closed by a bottom cap 5 with use of a welding apparatus or the like. The bottom cap 5 forms a base member together with the valve body 14 of the bottom valve 13.

An upper end side of the outer tube 4 is configured as an opening end. For example, a crimped or swaged portion 4A is formed on the opening end side of the outer tube 4 by bending the outer tube 4 radially inwardly. The crimped or swaged portion 4A holds an outer peripheral side of an annular plate body 12A of a seal member 12 with the annular plate body 12A prevented from being detached off.

Now, the inner tube 3 and the outer tube 4 form a cylinder, and the hydraulic fluid 2 is sealingly contained in this cylinder. In the present embodiment, the electrorheological fluid (ERF: Electro Rheological Fluid), which is one kind of functional fluid, is used as fluid loaded (sealingly contained) in the cylinder, i.e., the hydraulic fluid 2 that is the hydraulic oil. FIGS. 1 and 2 illustrate the sealingly contained hydraulic fluid 2 in a colorless and transparent manner.

The electrorheological fluid is fluid (the functional fluid) having a property changing according to an electric field (a voltage). More specifically, the electrorheological fluid has a viscosity changing according to an applied voltage, and thus exhibits a flow resistance (a damping force) changing according thereto. The electrorheological fluid includes, for example, base oil (base fluid) embodied by silicon oil or the like, and particles (fine particles) mixed (distributed) in this base oil and making the viscosity changeable according to a change in the electric field.

As will be described below, the shock absorber 1 is configured to control (adjust) a generated damping force by producing the electric field in the electrode passage 19 between the inner tube 3 and the electrode tube 18 to thus control the viscosity of the electrorheological fluid passing through this electrode passage 19. In the present embodiment, the shock absorber 1 will be described assuming that the electrorheological fluid (the ER fluid) is used as the functional fluid by way example. However, for example, magnetic fluid (MR fluid) having a fluid property changing according to a magnetic field may be used as the functional fluid.

The annular reservoir chamber A serving as a reservoir is formed between the inner tube 3 and the outer tube 4, more specifically, between the electrode tube 18 and the outer tube 4. Gas serving as working gas is sealingly contained together with the hydraulic fluid 2 in the reservoir chamber A. This gas may be air in an atmospheric pressure state, or gas such as compressed nitrogen gas may be used as it. At the time of compression (a compression stroke) of the piston rod 9, the gas in the reservoir chamber A is compressed so as to compensate for a volume of an entry of this piston rod 9.

The piston 6 is slidably provided in the inner tube 3. The piston 6 divides the inside of the inner tube 3 into the rod-side oil chamber B serving as a first chamber and a bottom-side oil chamber C serving as a second chamber. A plurality of oil passages 6A and a plurality of oil passages 6B are each formed on the piston 6 so as to be circumferentially spaced apart from one another. The oil passages 6A and 6B can establish communication between the rod-side oil chamber B and the bottom-side oil chamber C.

Then, the shock absorber 1 according to the embodiment is configured as a uniflow structure. Therefore, the hydraulic fluid 2 in the inner tube 3 flows from the rod-side oil chamber B (i.e., the oil holes 3A of the inner tube 3) toward the electrode passage 19 constantly unidirectionally (i.e., in a direction of an arrow D indicated by an alternate long and two short dashes line in FIG. 1) during both the compression stroke and an extension stroke of the piston rod 9.

To realize such a uniflow structure, for example, a compression-side check valve 7 is provided on an upper end surface of the piston 6. The compression-side check valve 7 is opened when the piston 6 is slidably displaced downward in the inner tube 3 during the compression stroke (inward stroke) of the piston rod 9, and otherwise is closed. The compression-side check valve 7 permits the oil fluid (the hydraulic fluid 2) in the bottom-side oil chamber C to flow through each of the oil passages 6A toward the rod-side oil chamber B, and prohibits the oil fluid from flowing in an opposite direction therefrom. In other words, the compression-side check valve 7 permits only the flow of the hydraulic fluid 2 directed from the bottom-side oil chamber C toward the rod-side oil chamber B.

For example, an extension-side disk valve 8 is provided on a lower end surface of the piston 6. The extension-side disk valve 8 is opened upon exceedance of a pressure in the rod-side oil chamber B over a relief setting value when the piston 6 is slidably displaced upward in the inner tube 3 during the extension stroke (an outward stroke) of the piston rod 9, and releases a pressure at this time to the bottom-side oil chamber C side via each of the oil passages 6B.

The piston rod 9 as a rod extends in the inner tube 3 in an axial direction (the same direction as axial directions of the inner tube 3 and the outer tube 4, i.e., a central axis of the shock absorber 1, and a vertical direction in FIGS. 1 and 2). More specifically, the piston rod 9 has a lower end coupled (fixed) to the piston 6 in the inner tube 3, and an upper end passing through the rod-side oil chamber B to extend out of the inner tube 3 and the outer tube 4. In this case, the piston 6 is fixed (fixedly attached) to the lower end side of the piston rod 9 with use of a nut 9A and the like. On the other hand, the upper end side of the piston rod 9 protrudes outward via the rod guide 10. The shock absorber 1 may be configured as a double rod-type shock absorber in which the lower end of the piston rod 9 is further elongated to protrude outward from the bottom portion (for example, the bottom cap 5) side.

The stepped cylindrical rod guide 10 is fittedly provided on the upper end sides of the inner tube 3 and the outer tube 4 so as to close the upper end sides of these inner tube 3 and outer tube 4. The rod guide 10 functions to support the piston rod 9, and is formed as a cylindrical member having a predetermined shape by performing molding processing, cutting processing, or the like on, for example, a metallic material or a rigid resin material. The rod guide 10 positions the upper portion of the inner tube 3 and the upper portion of the electrode tube 18 at a center of the outer tube 4. Along therewith, an inner peripheral side of the rod guide 10 axially slidably leads (guides) the piston rod 9.

Now, the rod guide 10 is formed into a stepped cylindrical shape defined by an annular large-diameter portion 10A and a short tubular small-diameter portion 10B. The large-diameter portion 10A is located on an upper side, and is fittedly inserted on an inner peripheral side of the outer tube 4. The small-diameter portion 10B is located on a lower end side of this large-diameter portion 10A, and is fittedly inserted on an inner peripheral side of the inner tube 3. A guide portion 10C is provided on an inner peripheral side of the small-diameter portion 10B of the rod guide 10. The guide portion 10C axially slidably guides the piston rod 9. The guide portion 10C is formed by, for example, coating an inner peripheral surface of a metallic tube with tetrafluoroethylene.

On the other hand, an annular holding member 11 is fittedly attached on an outer peripheral side of the rod guide 10 and between the large-diameter portion 10A and the small-diameter portion 10B. The holding member 11 holds the upper end side of the electrode tube 18 in an axially positioned state. The holding member 11 is made from, for example, an electric insulating material (an isolator), and holds the inner tube 3 and the rod guide 10, and the electrode tube 18 in a state electrically insulated therebetween.

The annular seal member 12 is provided between the large-diameter portion 10A of the rod guide 10 and the crimped or swaged portion 4A of the outer tube 4. The seal member 12 includes the metallic annular plate body 12A, and an elastic body 12B made from an elastic material such as rubber. The annular plate body 12A includes, at a center thereof, a hole through which the piston rod 9 is inserted. The elastic body 12B is fixedly attached to this annular plate body 12A by a method such as baking. The seal member 12 liquid-tightly or air-tightly provides a seal (seals) between the cylinder and the piston rod 9 due to a sliding contact of an inner periphery of the elastic body 12B with an outer peripheral side of the piston rod 9.

The bottom valve 13 is provided on the lower end side of the inner tube 3 at a position between this inner tube 3 and the bottom cap 5. The bottom valve 13 functions to establish/block communication between the bottom-side oil chamber C and the reservoir chamber A. Therefore, the bottom valve 13 includes the valve body 14, an extension-side check valve 15, and a disk valve 16. The valve body 14 defines the reservoir chamber A and the bottom-side oil chamber C between the bottom cap 5 and the inner tube 3.

Oil passages 14A and 14B are each formed on the valve body 14 so as to be circumferentially spaced apart from one another. The oil passages 14A and 14B can establish communication between the reservoir chamber A and the bottom-side oil chamber C. A stepped portion 14C is formed on an outer peripheral side of the valve body 14, and an inner peripheral side of the lower end of the inner tube 3 is fittedly fixed to this stepped portion 14C. Further, an annular holding member 17 is attached to the stepped portion 14C fittedly to the outer peripheral side of the inner tube 3.

The extension-side check valve 15 is provided on, for example, an upper surface side of the valve body 14. The extension-side check valve 15 is opened when the piston 6 is slidably displaced upward during the extension stroke of the piston rod 9, and otherwise is closed. The extension-side check valve 15 permits the oil fluid (the hydraulic fluid 2) in the reservoir chamber A to flow through inside each of the oil passages 14A toward the bottom-side oil chamber C, and prohibits the oil fluid from flowing in an opposite direction therefrom. In other words, the extension-side check valve 15 permits only the flow of the hydraulic fluid 2 directed from the reservoir chamber A side toward the bottom-side oil chamber C.

The compression-side disk valve 16 is provided on, for example, a lower surface side of the valve body 14. The compression-side disk valve 16 is opened upon exceedance of a pressure in the bottom-side oil chamber C over a relief setting value when the piston 6 is slidably displaced downward during the compression stroke of the piston rod 9, and relieves a pressure at this time by releasing it to the reservoir chamber A side via each of the oil passages 14B.

The holding member 17 holds a lower end side of the electrode tube 18 in an axially positioned state. The holding member 17 is made from, for example, an electric insulating material (an isolator), and holds the inner tube 3 and the valve body 14, and the electrode tube 18 in a state electrically insulated therebetween. Further, a plurality of oil passages 17A is formed on the holding member 17. The oil passages 17A establish communication of the electrode passage 19 with the reservoir chamber A.

The electrode tube 18, which is made of an axially extending pressure pipe, is provided outside the inner tube 3, i.e., between the inner tube 3 and the outer tube 4. The electrode tube 18 serves as an intermediate tube between the inner tube 3 and the outer tube 4, and corresponds to a cylindrical outer tube electrode. The electrode tube 18 is made with use of a conductive material, and forms a cylindrical electrode. The electrode tube 18 defines the electrode passage 19 in communication with the rod-side oil chamber B between the electrode tube 18 and the inner tube 3.

In other words, the electrode tube 18 is attached via the holding members 11 and 17 provided so as to be axially (vertically) spaced apart from each other on the outer peripheral side of the inner tube 3. The electrode tube 18 defines an annular passage inside the electrode tube 18 (between an inner peripheral side of the electrode tube 18 and the outer peripheral side of the inner tube 3), i.e., the electrode passage 19 as an intermediate passage through which the hydraulic fluid 2 flows by surrounding the outer peripheral side of the inner tube 3 along an entire circumference thereof. A plurality of flow passages 24 is formed in the electrode passage 19 (i.e., between the outer peripheral surface of the inner tube 3 and the inner peripheral surface of the electrode tube 18) by a plurality of partition walls 20.

The electrode passage 19 is in constant communication with the rod-side oil chamber B via the oil holes 3A formed as the radial horizontal holes on the inner tube 3. More specifically, in the shock absorber 1, the hydraulic fluid 2 flows from the rod-side oil chamber B into the electrode passage 19 via the oil holes 3A during both the compression stroke and the extension stroke of the piston 6 as indicated by the arrow D representing the direction of the flow of the hydraulic fluid 2 in FIG. 1. When the piston rod 9 enters into and exits from the inside of the inner tube 3 (i.e., while the piston rod 9 repeats the compression stroke and the extension stroke), the hydraulic fluid 2 introduced into the electrode passage 19 flows from an axial upper end side toward an axial lower end side of the electrode passage 19 due to this entering and exiting movements.

At this time, the hydraulic fluid 2 in the electrode passage 19 flows in the flow passages 24 between the individual partition walls 20 while being guided by each of the partition walls 20. In other words, the hydraulic fluid 2 flows from inside the inner tube 3 into the electrode passage 19 and flows from one axial side toward the other axial side in the flow passages 24 due to extension-side and compression-side movements of the piston rod 9. Then, the hydraulic fluid 2 introduced into the electrode passage 19 flows out from the lower end side of the electrode tube 18 into the reservoir chamber A via the oil passages 17A of the holding member 17.

The electrode passage 19 applies a resistance to the fluid flowing due to the sliding movement of the piston 6 in the outer tube 4 and the inner tube 3, i.e., the electrorheological fluid serving as the hydraulic fluid 2. To exert this function, the electrode tube 18 is connected to a positive electrode of a battery 25 serving as a power source via, for example, a high-voltage driver (not illustrated) that generates a high voltage. The battery 25 (and the high-voltage driver) serves as a voltage supply portion (an electric field supply portion), and the electrode tube 18 serves as an electrode (an electric conductor) that provides the electric field (the voltage) to the hydraulic fluid 2, which is the fluid in the electrode passage 19, i.e., the electrorheological fluid as the functional fluid. In this case, both the end sides of the electrode tube 18 are electrically insulated by the electrically insulating holding members 11 and 17. On the other hand, the inner tube 3 is connected to a negative electrode (ground) via the rod guide 10, the bottom valve 13, the bottom cap 5, the outer tube 4, a high-voltage driver, and the like.

The high-voltage driver increases a direct-current voltage output from the battery 25 to supply (output) it to the electrode tube 18 based on an instruction (a high-voltage instruction) output from a controller (not illustrated) for variably adjusting the damping force of the shock absorber 1. This causes generation of a potential difference according to the voltage applied to the electrode tube 18 between the electrode tube 18 and the inner tube 3, i.e., in the electrode passage 19, and thus causes a change in the viscosity of the hydraulic fluid 2 that is the electrorheological fluid. In this case, the shock absorber 1 can continuously adjust a characteristic of the generated damping force (a damping force characteristic) between a low (soft) characteristic (a weak characteristic) and a high (hard) characteristic (a strong characteristic) according to the voltage applied to the electrode tube 18. The shock absorber 1 may be able to adjust the damping force characteristic through two steps or a plurality of steps without being limited to continuously adjusting the damping force characteristic.

Now, a damping force variable range of the shock absorber mainly depends on the length of the flow passage formed by the helical members between the outer tube and the inner tube. Therefore, if a further wide damping force variable range is desired to be acquired, the helical members should be installed with a reduced angle (a pitch) (a reduced inclined angle) and an increased flow passage length. However, setting the pitch between the helical members to a small pitch leads to a large change in the flow direction of the hydraulic fluid (the electrorheological fluid) at the entrance of the flow passage, thereby raising a possibility of disturbing the flow of the hydraulic fluid and thus making the damping force characteristic unstable. Further, reducing the angle between the helical members leads to a reduction in the opening area of the flow passage, thereby raising a possibility of generating a soft damping force (a minimum damping force) excessive for a desired value.

On the other hand, in the present embodiment, the flow passages 24 are each provided with a flow passage cross-sectional area change portion that allows the flow passage 24 to have a larger cross-sectional area on one side spaced apart from the entrance side at least compared to an entrance side (the oil hole 3A side) of the extension-side flow passage. In this case, at the flow passage cross-sectional area change portion, the partition walls 20 corresponding to the helical members are configured in the following manner. In the following description, the partition walls 20 according to the preset embodiment will be described with reference to FIGS. 1 to 3.

The plurality of partition walls 20 as the seal portion (a seal member) is located on the outer peripheral side of the inner tube 3, and is provided in a vertically extending helical manner. Each of the partition walls 20 forms the plurality of flow passages 24, which will be described below, between the inner tube 3 and the electrode tube 18. Each of the partition walls 20 is made from a polymer material elastic, such as elastomer, and electrically insulative. Examples thereof include synthetic rubber. Each of the partition walls 20 is, for example, fixedly attached (adhered) to the inner tube 3 with use of an adhesive.

The oil holes 3A of the inner tube 3 are provided at positions above the respective partition walls 20 and axially opposite from (facing) upper end portions of the respective partition walls 20. In other words, the oil holes 3A of the inner tube 3 and the upper end portions of the partition walls 20 (sharply inclined portions 21A and upper end portions of upper short partition walls 22, which will be described below) are disposed in axial alignment with each other. The position of each of the oil holes 3A is not limited thereto, and may be provided at, for example, a position above each of the partition walls 20 and between the individual partition walls 20. In a case where the shock absorber 1 is configured as a bi-flow structure, an oil hole would also be provided at a position below each of the partition walls 20 in addition to the oil hole 3A.

Then, the partition walls 20 include a plurality of (for example, two) long partition walls 21, a plurality of (for example, two) upper short partition walls 22, and a plurality of (for example, two) lower short partition walls 23. The long partition walls 21 extend helically continuously from the upper end side (an inflow side) to the lower end side (an outflow side) of the inner tube 3. The upper short partition walls 22 are provided on the upper end side of the inner tube 3, and are shorter than the long partition walls 21. The lower short partition walls 23 are provided on the lower end side of the inner tube 3, and are shorter than the long partition walls 21.

As illustrated in FIGS. 2 and 3, each of the long partition walls 21 include the sharply inclined portion 21A and a mildly inclined portion 21B. The sharply inclined portion 21A is provided in an inflow region E of the hydraulic fluid 2 that is located on the upper end side (the oil hole 3A side) of the inner tube 3. The mildly inclined portion 21B is provided in an intermediate region F of the vertical direction of the inner tube 3 and an outflow region G of the hydraulic fluid 2 that is located on the lower end side of the inner tube 3. In this case, the inflow region E forms the entrance sides of the extension-side flow passages 24, and is set to from an upper quarter to a part (for example, 25% to 2.5%) of the vertical direction of the inner tube 3 where the long partition walls 21 are disposed.

On the other hand, the intermediate region F forms the one side spaced apart from the entrance side, and is set to from a half to a part (for example, 50% to 95%) of an intermediate portion of the vertical direction of the inner tube 3 where the long partition walls 21 are disposed. Further, the inflow region G is set to from a lower quarter to a part (for example, 25% to 2.5%) of the vertical direction of the inner tube 3 where the long partition walls 21 are disposed. The ratio of the inflow region E, the intermediate region F, and the outflow region G can be set from, for example, an experiment, a calculation, or a simulation according to the specifications, the dimensions, and the like of the shock absorber 1 so as to be able to acquire a desired performance (a damping performance and a response performance).

In other words, each of the long partition walls 21 is inclined at an inconstant angle, and includes the sharply inclined portion 21A inclined at a large angle at least on the entrance side (the inflow region E) of the flow passage 24 on the extension side of the piston rod 9 (the upper end side of the inner tube 3). More specifically, the sharply inclined portion 21A inclined at the large angle compared to the other portion (the mildly inclined portion 21B) is provided on one end side of each of the long partition walls 21.

Next, the inclination angles of the sharply inclined portion 21A and the mildly inclined portion 21B of the long partition wall 21 will be described.

As illustrated in FIG. 2, the sharply inclined portion 21A and the mildly inclined portion 21B extend obliquely with respect to a direction of an axis K-K of the electrode tube 18. Then, as illustrated in FIG. 3, assuming that L-L represents an imaginary line in parallel with the axis K-K of the electrode tube 18, and M-M represents an imaginary line perpendicular to this imaginary line L-L (a perpendicular line), an angle α defined between the sharply inclined portion 21A and the imaginary line M-M is larger than an angle β defined between the mildly inclined portion 21B and the imaginary line M-M. In other words, the defined angle α and the defined angle β are in a relationship indicated by the following equation 1.

$$\alpha > \beta \quad \text{[Equation 1]}$$

In other words, the sharply inclined portion 21A is provided at a position closer to the imaginary line L-L than the mildly inclined portion 21B is, and the mildly inclined portion 21B is provided at a position closer to the imaginary line M-M than the sharply inclined portion 21A is. Therefore, the long partition wall 21 is inclined at an inconstant angle with respect to the imaginary line M-M, and includes the sharply inclined portion 21A inclined at a large angle with respect to the imaginary line M-M at least on the entrance side of the extension-side flow passage 24.

A bent portion 21C, where the sharply inclined portion 21A and the mildly inclined portion 21B are connected to each other, is formed at a boundary portion between the inflow region E and the intermediate region F. The bent portion 21C can be prepared as a curved connection portion to allow the sharply inclined portion 21A and the mildly inclined portion 21B to be smoothly continuous (connected) with each other. Due to this configuration, the shock absorber 1 can achieve a smooth flow of the hydraulic fluid 2 when the hydraulic fluid 2 flows in from a sharply inclined flow passage 24A to a mildly inclined flow passage 24B, thereby further preventing or reducing the disturbance in the damping force characteristic.

Next, the upper short partition walls 22 and the lower short partition walls 23 will be described.

Each of the upper short partition walls 22 is located between the sharply inclined portions 21A of the respective long partition walls 21, and is provided only in the inflow region E. In this case, each of the upper short partition walls 22 extends in parallel with the sharply inclined portion 21A. More specifically, the upper short partition wall 22 is inclined at the angle α with respect to the imaginary line M-M, and has a lower end located at the boundary portion between the inflow region E and the intermediate region F. The upper short partition wall 22 forms a sharply inclined portion in the present invention together with the sharply inclined portion 21A of the long partition wall 21. As illustrated in FIG. 3, four partition walls 20 are provided in the inflow region E, and two partition walls 20 are provided in the intermediate region F. In other words, the number of partition walls 20 is smaller on the one side spaced apart from the entrance side (the intermediate region F) at least compared to the entrance side of the extension-side flow passage 24 (the inflow region E). Due to this configuration, the shock absorber 1 allows the mildly inclined flow passage 24B to have a larger flow passage cross-sectional area in the intermediate region F compared to a flow passage cross-sectional area of the sharply inclined flow passage 24A in the inflow region E. In other words, the flow passage 24 is provided with the flow passage cross-sectional area change portion configured by the sharply inclined flow passage 24A having the small cross-sectional area and the mildly inclined flow passage 24B having the larger cross-sectional area than the sharply inclined flow passage 24A.

Further, each of the lower short partition walls 23 is located between the mildly inclined portions 21B of the respective long partition walls 21, and is provided only in the outflow region G. In this case, each of the lower short partition walls 23 extends in parallel with the mildly inclined portion 21B. More specifically, the lower short partition wall 23 is inclined at the angle β with respect to the imaginary line M-M, and has an upper end located at the boundary portion between the intermediate region F and the outflow region G. The upper short partition wall 22 and the lower short partition wall 23 are provided at positions corresponding to each other in the vertical direction (the axial direction of the inner tube 3). This means that four partition walls 20 are provided in the outflow region G in a similar manner to the provision thereof in the inflow region E.

Therefore, assuming that X represents the number of partition walls 20 in the inflow region E, Y represents the number of partition walls 20 in the intermediate region F, and Z represents the number of partition walls 20 in the outflow region G, a relationship expressed by the following equation 2 is established among them.

$$X > Y$$
$$Z > Y \quad \text{[Equation 2]}$$

The number of partition walls 20 (i.e., the number of flow passages 24) in each of the inflow region E, the intermediate region F, and the outflow region G can be set from, for example, an experiment, a calculation, or a simulation according to an outer diameter dimension of the inner tube 3, the angles α and β defined with the imaginary line M-M, and the specifications, the dimensions, and the like of the shock absorber 1 so as to be able to acquire a desired performance (the damping performance and the response performance).

Next, the flow passage 24 of the hydraulic fluid 2 formed by each of the partition walls 20 will be described.

Each of the flow passages 24 is formed between the partition walls 20 adjacent to each other. The hydraulic fluid 2 flows from the axially upper end side toward the axially lower end side in each of the flow passages 24 according to the entering and exiting movements of the piston rod 9. As illustrated in FIG. 2, each of the partition walls 20 is formed into a circumferentially extending helical shape. Due to this configuration, the flow passage 24 formed between the partition walls 20 adjacent to each other also has a circumferentially extending helical shape.

Each of the flow passages 24 is prepared as a flow passage through which the hydraulic fluid 2 flows in a clockwise direction as viewed from the axially upper side (the oil hole 3A side) toward the axially lower side of the inner tube 3. Due to this configuration, the shock absorber 1 can increase the length of the flow passage from the oil hole 3A to the oil passage 17A of the holding member compared to the axially linearly extending flow passage. Then, the flow passage 24 includes the sharply inclined flow passage 24A formed in the inflow region E, and the mildly inclined flow passage 24B formed in the intermediate region F and the outflow region G.

The sharply inclined flow passage 24A is formed between the sharply inclined portion 21A of the long partition wall 21 and the upper short partition wall 22. This means that the sharply inclined flow passages 24A are provided as many as a total of the number of sharply inclined portions 21A of the long partition walls 21 and the number of upper short partition walls 22 (for example, four). The sharply inclined flow passage 24A is inclined at a larger angle with respect to the imaginary line M-M compared to the mildly inclined flow passage 24B. Then, the hydraulic fluid 2 flowing out from the oil hole 3A of the inner tube 3 is guided from an entrance 24A1 of the sharply inclined flow passage 24A into the sharply inclined flow passage 24A.

In this case, since the sharply inclined portion 21A and the upper short partition wall 22 are inclined at the large angle $\alpha$ with respect to the imaginary line M-M, the shock absorber 1 can prevent or reduce a sudden change in the flow direction of the hydraulic fluid 2 at the entrance 24A1 of the sharply inclined flow passage 24A. Further, the shock absorber 1 allows the number of sharply inclined flow passages 24A to increase in the inflow region E due to the upper short partition walls 22, thereby allowing the hydraulic fluid to flow at an even speed around the entrances 24A1 of the sharply inclined flow passages 24A.

As a result, the shock absorber 1 can adjust the flow of the hydraulic fluid 2 flowing into the sharply inclined flow passages 24A, thereby acquiring the stable damping force characteristic. The number of sharply inclined flow passages 24A is four in the present embodiment, but the number of sharply inclined flow passages 24A required to allow the hydraulic fluid 2 to flow at the even speed increase according to an increase in an outer diameter dimension of the inner tube 3, and a reduction in the inclination angle $\alpha$ of the sharply inclined portions 21A and the upper short partition walls 22 with respect to the imaginary line M-M.

The hydraulic fluid 2 flowing in the sharply inclined flow passages 24A is guided to the mildly inclined flow passages 24B. The mildly inclined flow passages 24B are inclined at the smaller angle $\beta$ with respect to the imaginary line M-M compared to the sharply inclined flow passages 24A. Due to this configuration, the shock absorber 1 can secure a length of the flow passage of the hydraulic fluid 2, thereby acquiring a desired damping force. Then, the mildly inclined flow passages 24B each include a large flow passage portion 24B1 and a small flow passage portion 24B2. The large flow passage portion 24B1 is located in the intermediate region F, and is formed between the mildly inclined portions 21B of the long partition walls 21 adjacent to each other. The small flow passage portion 24B2 is located in the outflow region G, and is formed between the mildly inclined portion 21B and the lower short partition wall 23.

As illustrated in FIG. 3, an upper end side of the large flow passage portion 24B1 is connected to the sharply inclined flow passage portion 24A, and there are provided as many large flow passage portions 24B1 as the total number of mildly inclined portions 21B of the long partition walls 21 (for example, two). In other words, the number of partition walls 20 is smaller in the intermediate region F than in the inflow region E, and this forms the flow passage cross-sectional area change portion that changes the cross-sectional area of the flow passage 24. The large flow passage portion 2431 of each of the mildly inclined flow passages 24B has a larger flow passage cross-sectional area than a flow passage cross-sectional area of the sharply inclined flow passage 24A. As a result, the shock absorber 1 can allow the large flow passage portion 24B1 to have a larger opening area at an entrance 24B3, thereby curbing (easing) an increase in the soft damping force.

An upper end side of the small flow passage portion 24B2 is connected to the large flow passage portion 2431, and there are provided as many small flow passage portions 24B2 as the total number of mildly inclined portions 21B of the long partition walls 21 and the lower short partition walls 23 (for example, four). In other words, the number of partition walls 20 is larger in the outflow region G than in the intermediate region F. Therefore, the shock absorber 1 can extend the length of the flow passage of the hydraulic fluid 2 in the outflow region G, thereby increasing the damping force variable range.

The positive electrode of the battery 25 is connected to the electrode tube 18 via the not-illustrated high-voltage driver. This battery 25 serves as the portion that supplies the voltage to the electrode tube 18 (the electric field supply portion). Due to this configuration, the battery 25 continuously adjusts the characteristic of the generated damping force (the damping force characteristic) between the low (soft) characteristic (the weak characteristic) and the high (hard) characteristic (the strong characteristic) according to how high voltage (electric field) is applied to the hydraulic fluid 2 (electrorheological fluid) flowing in the electrode passage 19.

The shock absorber 1 according to the present embodiment is configured in the above-described manner, and an operation thereof will be described next.

When the shock absorber 1 is mounted on the vehicle such as the automobile, for example, the upper end side of the piston rod 9 is attached to the vehicle body side of the vehicle, and the lower end side (the bottom cap 5 side) of the outer tube 4 is attached to the wheel side (the axle side). When the vehicle is running, upon occurrence of a vertical vibration due to unevenness of a road surface or the like, the piston rod 9 is displaced so as to be extended and compressed from and into the outer tube 4. At this time, the generated damping force of the shock absorber 1 is variably adjusted by producing the potential difference in the electrode passage 19 with use of the battery 25 based on the instruction from the controller and controlling the hydraulic fluid 2 passing through each of the flow passages 24 in the electrode passage 19, i.e., the viscosity of the electrorheological fluid.

At the time of the extension stroke of the piston rod 9, the compression-side check valve 7 of the piston 6 is closed due to the movement of the piston 6 in the inner tube 3. Before the disk valve 8 of the piston 6 is opened, the oil fluid (the hydraulic fluid 2) in the rod-side oil chamber B is pressurized, thereby flowing into the electrode passage 19 via the oil holes 3A of the inner tube 3. At this time, the oil fluid flows from the reservoir chamber A into the bottom-side oil chamber C by opening the extension-side check valve 15 of the bottom valve 13 by an amount corresponding to the movement of the piston 6.

On the other hand, at the time of the compression stroke of the piston rod 9, the compression-side check valve 7 of the piston 6 is opened and the extension-side check valve 15 of the bottom valve 13 is closed due to the movement of the piston 6 in the inner tube 3. Before the bottom valve 13 (the disk valve 16) is opened, the oil fluid in the bottom-side oil chamber C flows into the rod-side oil chamber B. Along therewith, the oil fluid flows from the rod-side oil chamber B into the electrode passage 19 via the oil holes 3A of the inner tube 3 by an amount corresponding to the entry of the piston rod 9 into the inner tube 3.

Therefore, in either case (both at the time of the extension stroke and at the time of the compression stroke), the hydraulic fluid 2 introduced in the electrode passage 19 passes through inside the electrode passage 19 toward the exit side (downward) with the viscosity according to the potential difference in the electrode passage 19 (the potential difference between the electrode tube 18 and the inner tube 3), and flows from the electrode passage 19 into the reservoir chamber A via the oil passages 17A of the holding member 17. At this time, the shock absorber 1 can generate the damping force according to the viscosity of the hydraulic fluid 2 passing through each of the flow passages 24 in the electrode passage 19, thereby absorbing (damping) the vertical vibration of the vehicle.

Then, the above-described conventional technique includes the partition walls (the helical members) in the electrode passage, thereby extending the length of the flow passage of the hydraulic fluid and thus acquiring the large damping force variable range. In this case, a further large damping force variable range can be acquired by reducing the angle (the pitch) between the partition walls to thus further extend the length of the flow passage. However, reducing the angle between the partition walls leads to a large change in the flow direction of the hydraulic fluid at the entrance of the flow passage, thereby raising a possibility of disturbing the flow of the hydraulic fluid and thus making the damping force characteristic unstable. Further, reducing the pitch between the partition walls leads to a reduction in the opening area of the flow passage, thereby raising a possibility of making the soft damping force excessive for a desired value.

Therefore, in the present embodiment, the flow passages 24 are the helical flow passages formed by the plurality of helically extending partition walls 20, and the number of partition walls 20 is smaller on the one side spaced apart from the entrance side (the intermediate region F) at least compared to the entrance side of the extension-side flow passages 24 (the inflow region E). In other words, as illustrated in FIG. 3, the number X of partition walls 20 provided in the inflow region E is larger than the number Y of partition walls 20 provided in the intermediate region F (X>Y).

More specifically, the upper short partition wall 22 is provided between the sharply inclined portions 21A of the long partition walls 21 adjacent to each other in the inflow region E. The sharply inclined flow passage 24A, through which the hydraulic fluid 2 flows, is formed between the sharply inclined portion 21A and the upper short partition wall 22. On the other hand, only the mildly inclined portions 21B of the long partition walls 21 are provided in the intermediate region F. The large flow passage portion 24B1 of the mildly inclined flow passage 24B, where the adjacent sharply inclined flow passages 24A are joined to each other, is formed between the mildly inclined portions 21B adjacent to each other. Therefore, the number of partition walls 20 is larger in the inflow region E than in the intermediate region F by as many walls as the upper short partition walls 22.

Due to this configuration, the shock absorber 1 can allow the hydraulic fluid 2 to flow at the even speed around the entrances 24A1 when flowing down through the electrode passage 19 and flowing into the sharply inclined flow passages 24A after flowing out from the oil holes 3A of the inner tube 3. As a result, the shock absorber 1 can adjust the flow of the hydraulic fluid 2 flowing into the sharply inclined flow passages 24A, thereby acquiring the stable damping force characteristic.

Further, each of the partition walls 20 is inclined at the inconstant angle, and includes the sharply inclined portion 21A and the upper short partition wall 22 inclined at the large angle on the entrance side of the flow passage 24 on the extension side of the piston rod 9 (the inflow region E). In other words, the inclination angle α of the sharply inclined portion 21A and the upper short partition wall 22 provided in the inflow region E with respect to the imaginary line M-M is larger than the inclination angle β of the mildly inclined portion 21B provided in the intermediate region F with respect to the imaginary line M-M.

Therefore, the shock absorber 1 can prevent or reduce the sudden change in the direction of the flow of the hydraulic fluid 2 on the entrances 24A1 of the sharply inclined flow passages 24A when flowing down through the electrode passage 19 and flowing into the sharply inclined flow passages 24A after flowing out from the oil holes 3A of the inner tube 3. Further, the hydraulic fluid 2 smoothly flows from the sharply inclined portions 21A of the long partition walls 21 along the mildly inclined portions 21B of the long partition walls 21. As a result, the shock absorber 1 can prevent or reduce the disturbance, i.e., a variation of the damping force characteristic, thereby generating the stable damping force.

More specifically, at the time of the extension stroke and at the time of the compression stroke of the piston rod 9, the flow of the hydraulic fluid 2 introduced from the oil holes 3A of the inner tube 3 into the flow passages 24 is adjusted by the sharply inclined flow passages 24A, which are prepared in plenty and slightly change the direction of the flow of the hydraulic fluid 2. Then, the shock absorber 1 secures the lengths of the flow passages 24 due to the gently inclined flow passages 24B inclined at the smaller angle than the sharply inclined flow passages 24A. Further, the flow passages 24 are each provided with the flow passage cross-sectional area change portion. More specifically, the flow passage cross-sectional area change portion allows the large flow passage portion 24B1 of the mildly inclined flow passage 24B to have the larger flow passage cross-sectional area in the intermediate region F than the flow passage cross-sectional area of the sharply inclined flow passage 24A in the inflow region E by including the fewer partition walls 20 in the intermediate region F than in the inflow region E. Therefore, the shock absorber 1 can increase the opening areas of the large flow passage portions 24B1 at the entrances 24B3. As a result, the shock absorber 1 can curb the increase in the minimum (soft) damping force while maintaining the damping force variable range of the shock absorber 1. In other words, the number of partition walls 20 in the range of the intermediate region F is half as many as in the range of the inflow region E. Since the flow passage cross-sectional area formed between the mildly inclined portions 21B adjacent to each other in the range of the intermediate region F is larger than the flow passage cross-sectional area between the sharply inclined portion 21A and the upper short partition wall 22 in the range of the inflow region F, the shock absorber 1 can reduce the soft damping force.

Further, the lower short partition wall 23 is provided between the mildly inclined portions 21B of the long partition walls 21 adjacent to each other in the outflow region G. Therefore, in the outflow region G, the small flow passage portion 24B2 having the smaller flow passage cross-sectional area than the flow passage cross-sectional area of the large flow passage portion 24B1 is provided between the mildly inclined portion 21B and the lower short partition wall 23. As a result, the shock absorber 1 can extend the length of the flow passage of the hydraulic fluid 2, thereby increasing the damping force variable range.

Figure 4:
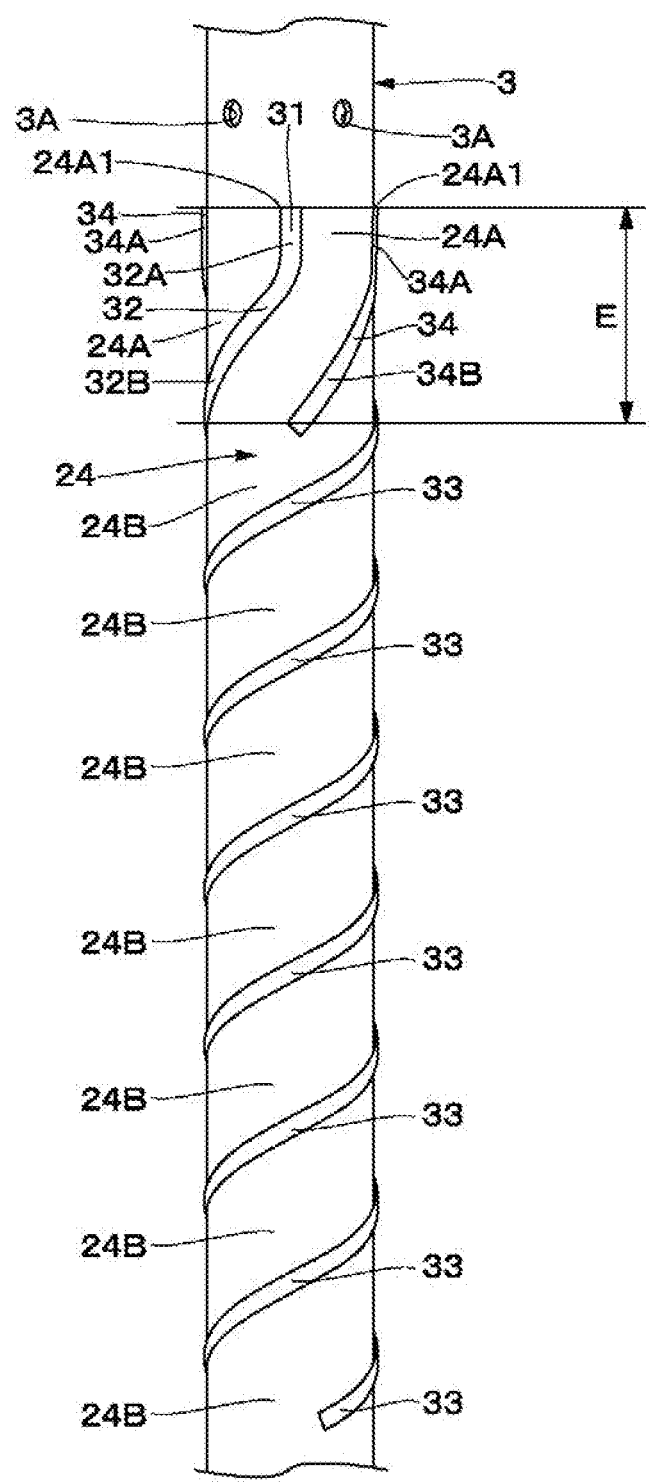
FIG. 4 is a front view illustrating an inner tube and seal portions according to a first modification.
Figure 5:
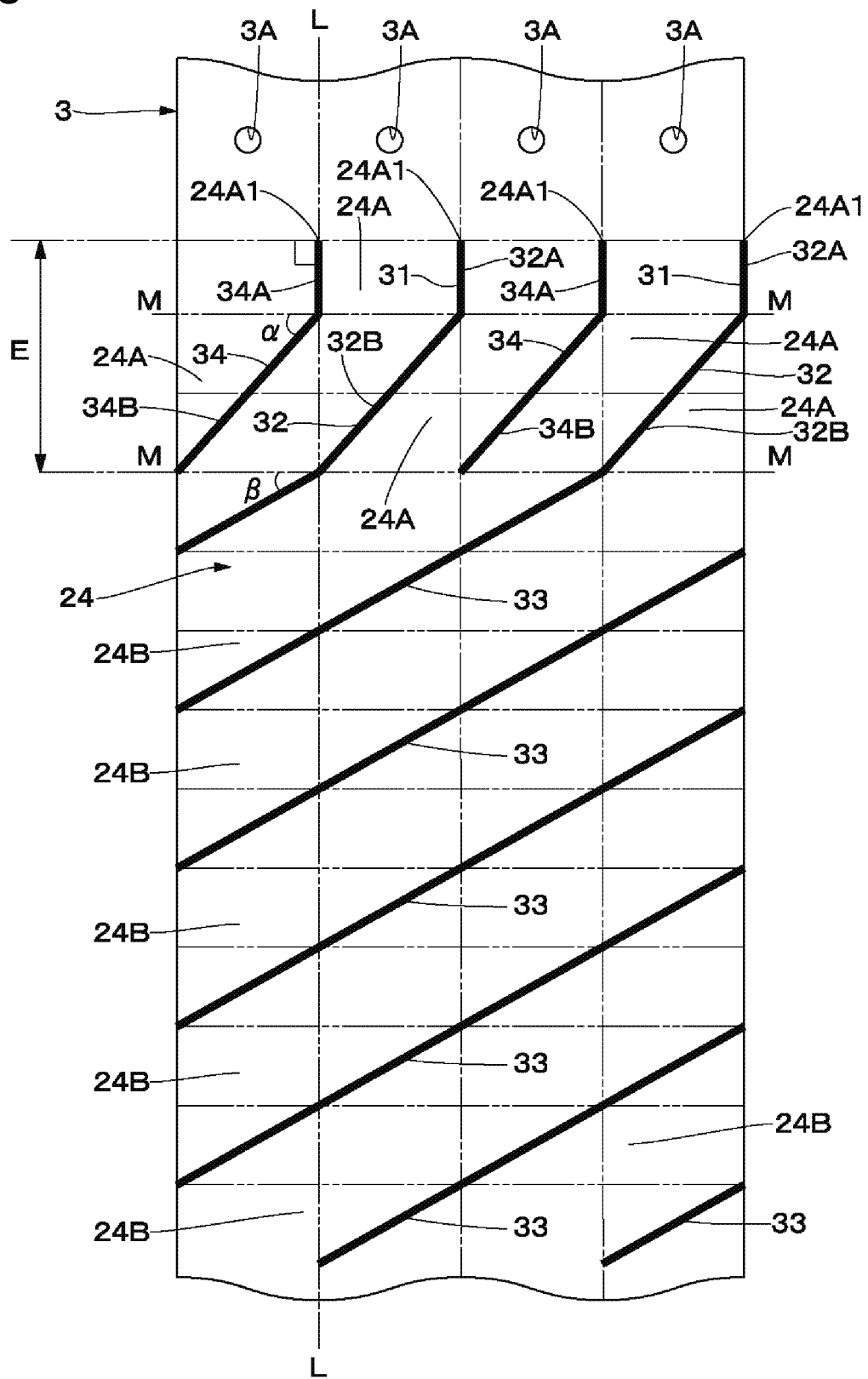
FIG. 5 illustrates the inner tube and the seal portions in the developed manner.

In the embodiment, the shock absorber 1 has been described as being configured in such a manner that the sharply inclined portion 21A and the upper short partition wall 22 provided in the inflow region E each extend in a straight line in an oblique direction from the imaginary line L-L by way of example. However, the present invention is not limited thereto, and a sharply inclined portion 32 of a long partition wall 31 and an upper short partition wall 34 provided in the inflow region E may be formed in a multistep manner by being bent, like, for example, a first modification illustrated in FIGS. 4 and 5. In this case, at the sharply inclined portion 32, an angle formed between the sharply inclined portion 32 and the imaginary line M-M may be bent in a multistep manner from 90 degrees toward the angle β formed between a mildly inclined portion 33 and the imaginary line M-M. Similarly, the upper short partition wall 34 may be provided in parallel with the sharply inclined portion 32 between the sharply inclined portions 32 adjacent to each other. The upper short partition wall 34 is provided only in the inflow region E.

More specifically, the sharply inclined portion 32 may include a parallel portion 32A extending in parallel with the axis K-K of the electrode tube 18 and an oblique portion 32B extending from a lower end of the parallel portion 32A toward the mildly inclined portion 33. Similarly, the upper short partition wall 34 may include a parallel portion 34A extending in parallel with the axis K-K of the electrode tube 18 and an oblique portion 34B extending from a lower end of the parallel portion 34A in parallel with the oblique portion 32B of the sharply inclined portion 32. As a result, the shock absorber 1 can adjust the flow of the hydraulic fluid 2, thereby acquiring the stable damping force characteristic.

Figure 6:
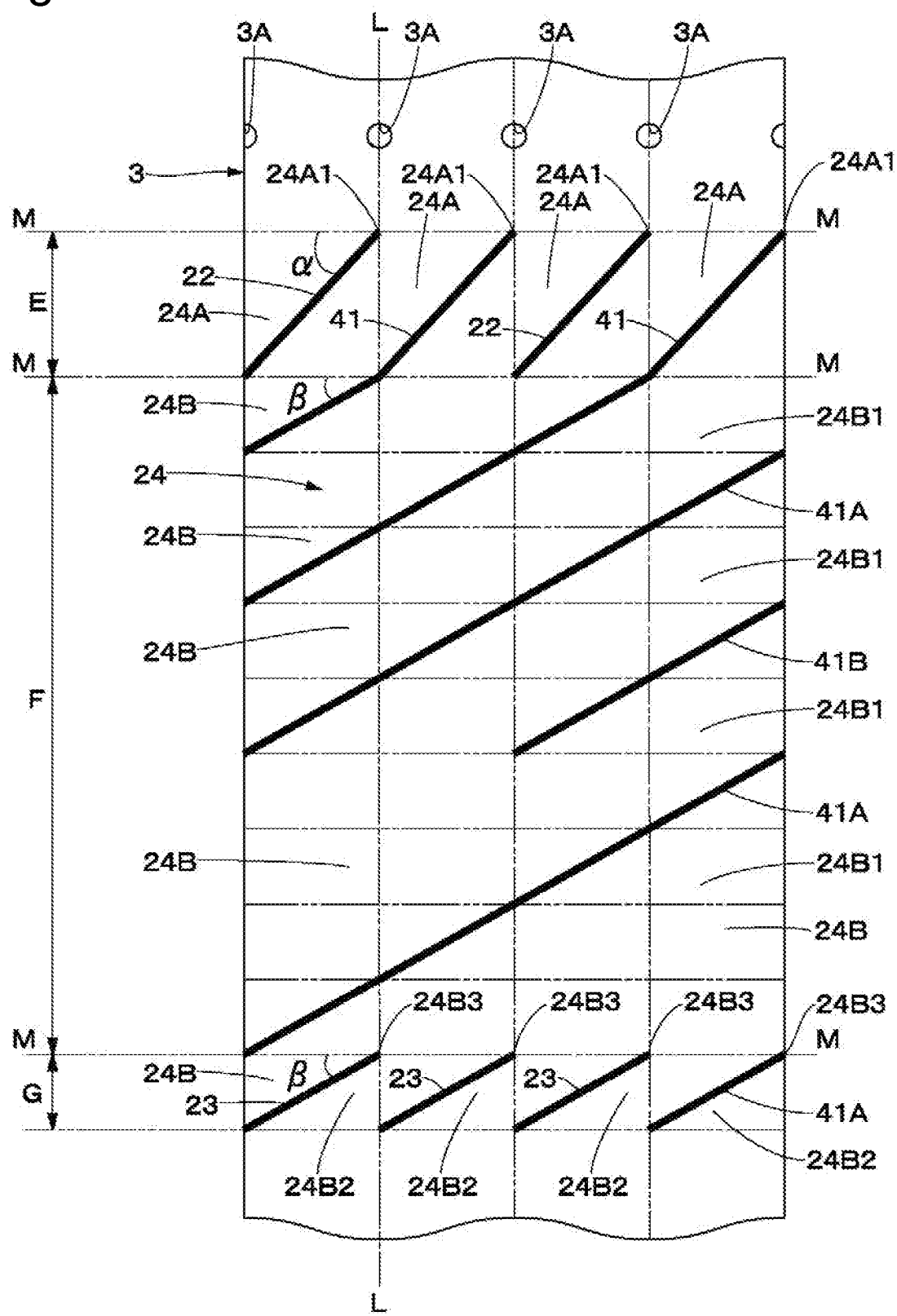
FIG. 6 illustrates an inner tube and seal portions according to a second modification in the developed manner.

In the embodiment, the shock absorber 1 has been described as being configured in such a manner that the mildly inclined portions 21B of the two long partition walls 21 are provided in the intermediate region F by way of example. However, the present invention is not limited thereto, and a long partition wall 41 may include an entire length partition wall 41A extending across from the inflow region E to the outflow region G and a cut length partition wall 41B cut at some position on the way of an intermediate portion B, like, for example, a second modification illustrated in FIG. 6. In other words, the number of long partition walls 41 may be reduced to one on the way of the intermediate region F. The present invention is not limited thereto, and the number of long partition walls 41 in the intermediate region F can be arbitrarily set according to the specifications, the dimensions, and the like of the shock absorber 1. The same also applies to the first modification.

In the embodiment, the shock absorber 1 has been described as being configured in such a manner that the angle defined by the mildly inclined portion 21B of the long partition wall 21 and the lower short partition wall 23 with respect to the imaginary line M-M in the outflow region G is equal to the angle defined by the mildly inclined portion 21B with respect to the imaginary line M-M in the intermediate region F (the angle β) by way of example. However, the present invention is not limited thereto, and, for example, the angle defined by the partition wall 20 with respect to the imaginary line M-M in the outflow region G may be set to a larger angle or may be set to a smaller angle than β. The same also applies to the first and second modifications.

In the embodiment, the shock absorber 1 has been described as being configured in such a manner that the angle defined between the mildly inclined portion 21B and the imaginary line M-M is evenly wound around on the outer peripheral side of the inner tube 3 in the intermediate region F by way of example. However, the present invention is not limited thereto, and the angle defined between the mildly inclined portion and the imaginary line M-M may be, for example, changed on the way of the intermediate region F. The same also applies to the first and second modifications.

In the embodiment, the shock absorber 1 has been described as being configured in such a manner that the flow passage 24 is provided as the helical flow passage by way of example. However, the present invention is not limited thereto, and the flow passage may be, for example, formed in a serpentine manner. More specifically, in the embodiment, the partition wall 20 is helically formed, and evenly circles in the same direction across from the upper end side to the lower end side of the inner tube 3. To modify it, for example, the partition wall may be configured to be folded back at an intermediate portion thereof (the circling direction is reversed at the intermediate portion, or changed from the clockwise direction to the counterclockwise direction or from the counterclockwise direction to the clockwise direction at the intermediate portion). The same also applies to first and second modifications.

In the embodiment, the shock absorber 1 has been described as including the partition wall 20 made from the synthetic rubber by way of example. However, the present invention is not limited thereto, and the partition wall 20 may be formed with use of, for example, a polymer material other than the synthetic rubber such as synthetic resin. Further, various kinds of materials capable of forming the flow passage can also be employed besides the polymer material. In any case, the seal portion forming the partition wall is made from an insulative material having an electric insulation property. The same also applies to the first and second modifications.

In the embodiment, the shock absorber 1 has been described as being configured in such a manner that the partition wall 20 is provided so as to be fixedly attached to the outer peripheral side of the inner tube 3 by way of example. However, the present invention is not limited thereto, and the shock absorber 1 may be configured in such a manner that, for example, the partition wall 20 is provided so as to be fixedly attached to the inner peripheral side of the intermediate tube (the electrode tube). The same also applies to the first and second modifications.

In the embodiment, the shock absorber 1 has been described as being configured in such a manner that the partition wall 20 is provided between the inner tube 3 and the electrode tube 18, i.e., the flow passage 24 is formed between the inner tube 3 and the electrode tube 18 by way of example. However, the present invention is not limited thereto, and the flow passage may be provided, for example, between the intermediate tube (the electrode tube) and the outer tube. In other words, the partition wall may be provided between the intermediate tube (the electrode tube) and the outer tube. In this case, the partition wall can be provided so as to be fixedly attached to the outer peripheral surface of the intermediate tube (the electrode tube) or the inner peripheral surface of the outer tube. The same also applies to the first and second modifications.

Figure 7:
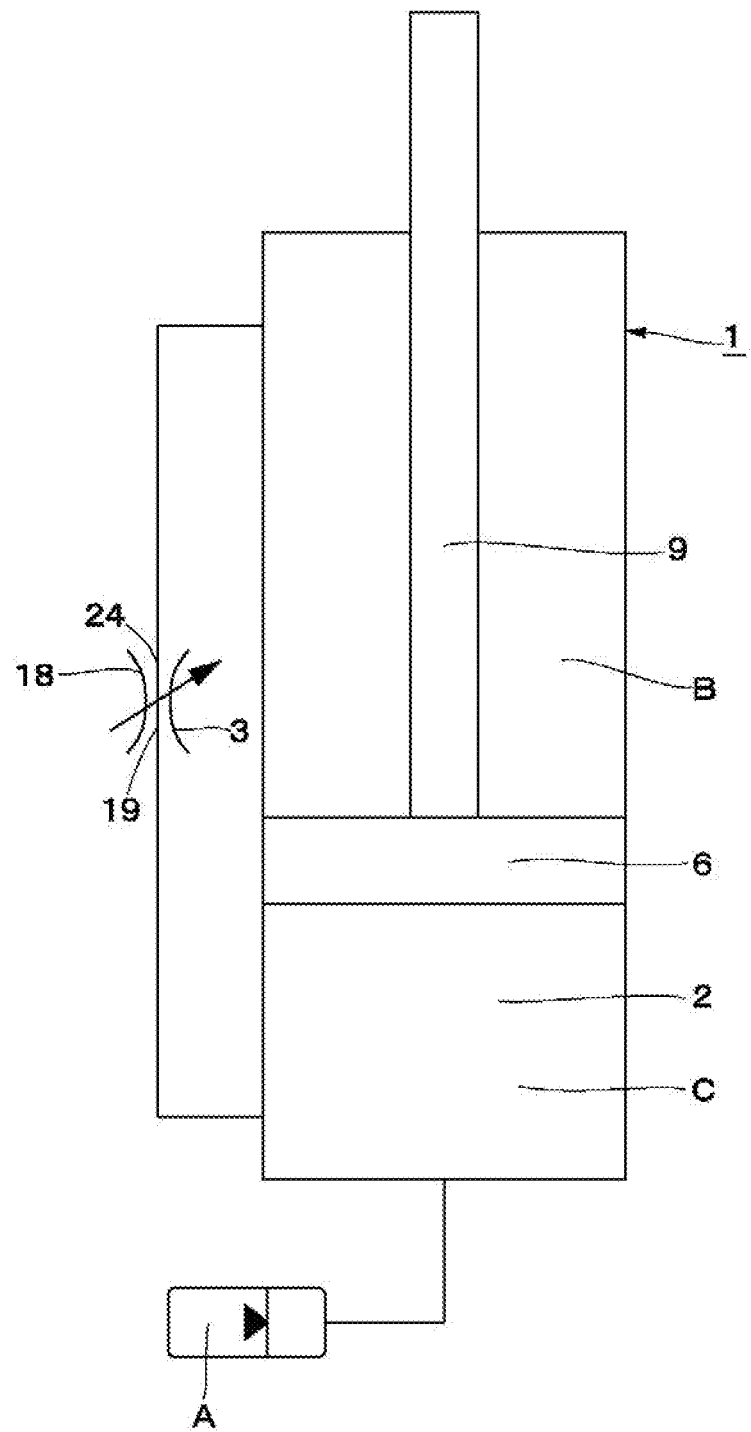
FIG. 7 illustrates the shock absorber when the shock absorber is configured as a bi-flow structure.
Figure 8:
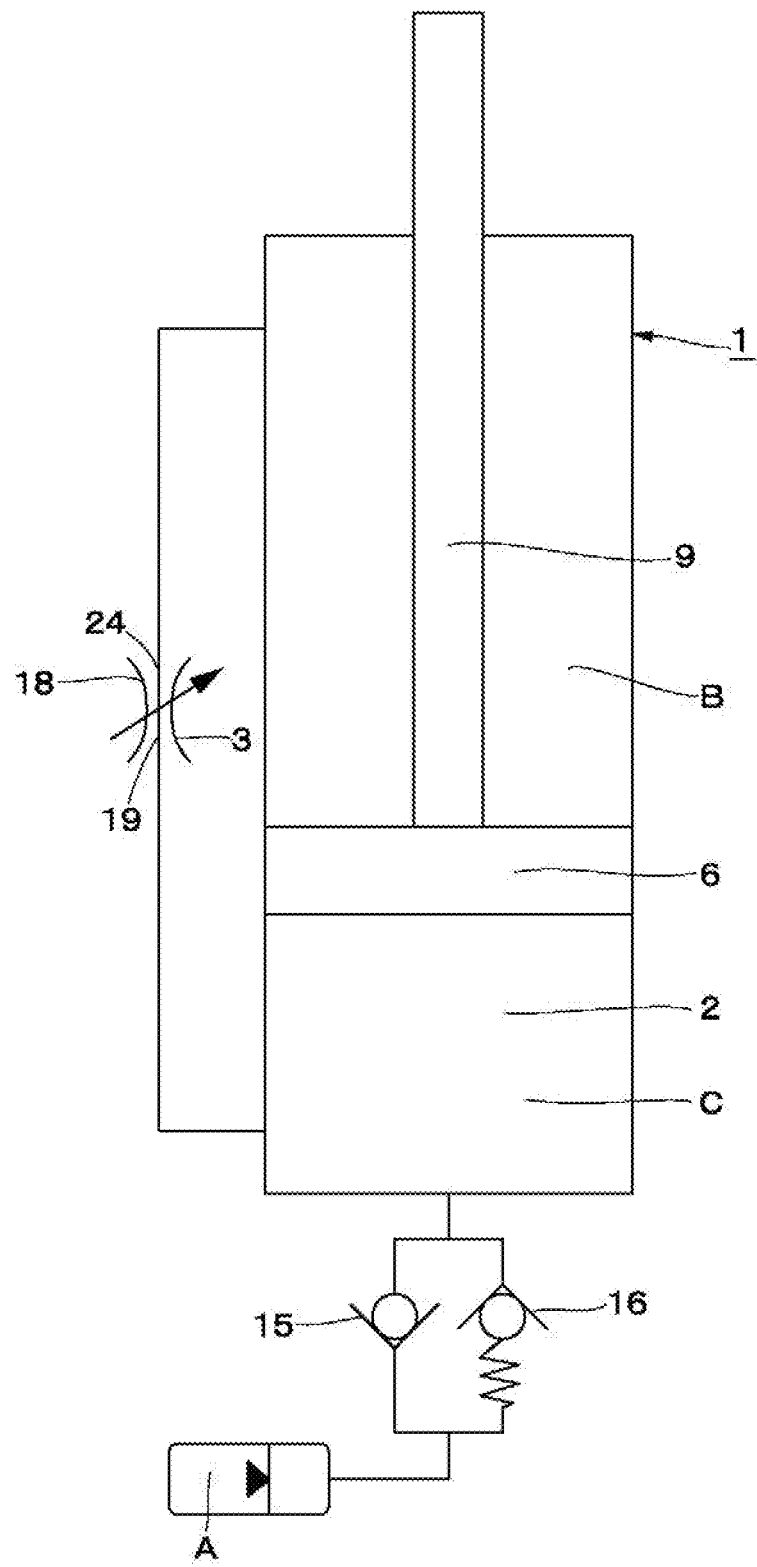
FIG. 8 illustrates the shock absorber when the shock absorber is configured as the bi-flow structure.

In the embodiment, the shock absorber 1 has been described as having the uniflow structure by way of example. However, the present invention is not limited thereto, and the shock absorber may be configured as such a bi-flow structure that the hydraulic fluid reciprocates in the flow passage according to the extension/compression of the piston rod as illustrated in FIGS. 7 and 8. The same also applies to the first and second modifications.

In the embodiment, the shock absorber 1 has been described as being configured to be arranged vertically by way of example. However, the present invention is not limited thereto, and the shock absorber 1 can be arranged in a desired direction according to an object on which the shock absorber 1 is mounted, such as being arranged while being tilted within a range that does not cause the aeration. The same also applies to the first and second modifications.

In the embodiment, the shock absorber 1 has been described as being configured in such a manner that the inner tube 3 is set as the inner tube electrode and the electrode tube 18 is set as the outer tube electrode by way of example. However, the present invention is not limited thereto, and the shock absorber 1 may be configured in such a manner that the electrode tube is set as the inner tube electrode and the outer tube is set as the outer tube electrode. In other words, the shock absorber 1 may be configured in a different manner as long as tubes radially adjacent to each other serve as electrodes having different potentials from each other. For example, the cylinder apparatus may be formed by two tubes, an inner tube and an outer tube, and use these inner tube and outer tube as the inner tube electrode and the outer tube electrode, respectively. The same also applies to the first and second modifications.

In the embodiment, the shock absorber 1 has been described as being configured in such a manner that the hydraulic fluid 2 flows from the axial upper end side (the one end side) to the axial lower end side (the other end side). However, the present invention is not limited thereto, and the shock absorber 1 may be configured in such a manner that the hydraulic fluid flows from the other axial end side to one axial end side, such as flowing from the lower end side toward the upper end side, flowing from a left end side (or a right end side) to the right end side (or the left end side), and flowing from a front end side (or a rear end side) to the rear end side (or the front end side) according to a direction in which the shock absorber 1 is arranged. The same also applies to the first and second modifications.

In the embodiment, the shock absorber 1 has been described assuming that the hydraulic fluid 2 as the functional fluid is embodied by the electrorheological fluid (the ER fluid) by way of example. However, the present invention is not limited thereto, and the hydraulic fluid as the functional fluid may be embodied with use of, for example, magnetic fluid (MR fluid) having a fluid property changing according to a magnetic field. In the case where the magnetic fluid is used, the shock absorber 1 can be configured to use the electrode tube 18 provided as the intermediate tube as a magnetic pole corresponding to the electrode (i.e., apply a magnetic field from a magnetic field supply portion to a magnetic pole tube that is the intermediate tube). In this case, for example, the magnetic field is generated between the inner tube (the inner tube electrode) and the magnetic pole tube (the outer tube electrode) (in a magnetic passage therebetween) by the magnetic field supply portion, and the magnetic field is variably controlled when the generated damping force is variably adjusted. Further, the holding members 11 and 17 and the like for insulation may be made from, for example, non-magnetic materials. The same also applies to the first and second modifications.

In the embodiment, the shock absorber 1 as the cylinder apparatus has been described as being configured to be used together with the four-wheeled automobile by way of example. However, the present invention is not limited thereto, and the shock absorber can be widely used as various kinds of shock absorbers (cylinder apparatuses) that absorb a shock on an object on which the shock should be absorbed, such as a shock absorber for use in a two-wheeled vehicle, a shock absorber for use in a railway train, a shock absorber for use in various kinds of equipment and machinery including general industrial machinery, and a shock absorber for use in a building. Further, the embodiment is only an example, and it is apparent that a configuration indicated in a different embodiment can be partially replaced or combined. In other words, the design of the cylinder apparatus (the shock absorber) can be changed within a range that does not depart from the spirit of the present invention.

In the present embodiment, the shock absorber 1 employs the flow passage cross-sectional area change portion configured by reducing the number of partition walls 20 as the seal portion defining the flow passages 24, but the flow passage cross-sectional area change portion is not limited thereto and may be realized in another manner that increases the flow passage cross-sectional area on the one side spaced apart from the entrance side compared to the entrance side of the extension-side flow passage. For example, the flow passage cross-sectional area change portion may be configured in such a manner that a difference is generated in the flow passage cross-sectional area by performing curving processing on the partition walls to thus increase the dimension between the partition walls adjacent to each other in the intermediate region F.

Possible configurations as the cylinder apparatus based on the above-described embodiment include the following examples.

According to a first configuration, a cylinder apparatus includes functional fluid sealingly contained in this cylinder apparatus and having a fluid property changing according to an electric field, and a rod inserted inside this cylinder apparatus. The cylinder apparatus includes an inner tube electrode and an outer tube electrode that are electrodes having different potentials from each other. The outer tube electrode is provided outside the inner tube electrode. The cylinder apparatus includes a flow passage formed between the inner tube electrode and the outer tube electrode. The flow passage is configured in such a manner that the functional fluid flows from one axial end side toward the other axial end side due to at least an extension-side movement of the rod. The flow passage is provided with a flow passage cross-sectional area change portion configured to allow the flow passage to have a larger cross-sectional area on one side spaced apart from an entrance side at least compared to the entrance side of an extension-side flow passage.

According to a second configuration, in the first configuration, a plurality of seal portions is provided in the flow passage. At the flow passage cross-sectional area change portion, the number of seal portions provided on the one side spaced apart from the entrance side is smaller at least compared to the number of seal portions provided on the entrance side of the extension-side flow passage.

According to a third configuration, in the second configuration, each of the seal portions is inclined at an inconstant angle with respect to an intersection line perpendicular to an axial direction, and includes a sharply inclined portion inclined at a large angle at least on the entrance side of the extension-side flow passage.

According to a fourth configuration, in the third configuration, the sharply inclined portion includes a portion extending obliquely with respect to an axial direction of the outer tube electrode.

According to a fifth configuration, in the third or fourth configuration, the sharply inclined portion includes a portion extending in parallel with the axial direction of the outer tube electrode.

The present invention is not limited to the above-described embodiment, and includes various modifications. For example, the above-described embodiment has been described in detail to facilitate better understanding of the present invention, and the present invention is not necessarily limited to the configuration including all of the described features. Further, a part of the configuration of some embodiment can be replaced with the configuration of another embodiment, and some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2017-068009 filed on Mar. 30, 2017. The entire disclosure of Japanese Patent Application No. 2017-068009 filed on Mar. 30, 2017 including the specification, the claims, the drawings, and the abstract is incorporated herein by reference in its entirety.

REFERENCE SIGNS LIST 1 shock absorber (cylinder apparatus)
2 hydraulic fluid (functional fluid)
3 inner tube (inner tube electrode)
4 outer tube
9 piston rod (rod)
18 electrode tube (outer tube electrode)
20 partition wall (seal portion)
21 long partition wall
21A, 32 sharply inclined portion
22 upper short partition wall (sharply inclined portion)
24 flow passage
32A, 34A parallel portion

The invention claimed is:
1. A cylinder apparatus comprising:
functional fluid sealingly contained in the cylinder apparatus, the functional fluid having a fluid property changing according to an electric field;
an inner tube electrode;
a rod inserted inside the inner tube electrode; and
an outer tube electrode,
wherein the inner tube electrode and the outer tube electrode are electrodes having different potentials from each other,
wherein the outer tube electrode is provided outside the inner tube electrode,
wherein the cylinder apparatus further includes a flow passage formed between the inner tube electrode and the outer tube electrode, the flow passage being configured in such a manner that the functional fluid flows from one axial end side toward the other axial end side due to at least an extension-side movement of the rod,
wherein the flow passage is provided with a flow passage cross-sectional area change portion configured such that a cross-sectional area of the flow passage extending from an entrance side region of the flow passage is larger than a cross-sectional area of the flow passage on the entrance side region thereof,
wherein a plurality of seal portions is provided in the flow passage, and
wherein the flow passage cross-sectional area change portion is configured by reducing the number of seal portions provided in the flow passage extending from an entrance side region of the flow passage compared to the number of seal portions provided in the entrance side region of the flow passage.

2. The cylinder apparatus according to claim 1, wherein a plurality of the seal portions is inclined at an inconstant angle with respect to an intersection line perpendicular to an axial direction, and includes a sharply inclined portion inclined at a large angle on the entrance side of the flow passage.

3. The cylinder apparatus according to claim 2, wherein each of the sharply inclined portions includes a portion extending obliquely with respect to an axial direction of the outer tube electrode.

4. The cylinder apparatus according to claim 3, wherein each of the sharply inclined portions includes a portion extending in parallel with the axial direction of the outer tube electrode.

5. The cylinder apparatus according to claim 2, wherein each of the sharply inclined portions includes a portion extending in parallel with the axial direction of the outer tube electrode.

6. A cylinder apparatus comprising:
functional fluid sealingly contained in the cylinder apparatus, the functional fluid having a fluid property changing according to an electric field;
an inner tube electrode;
a rod inserted inside the inner tube electrode; and
an outer tube electrode,
wherein the inner tube electrode and the outer tube electrode are electrodes having different potentials from each other,
wherein the outer tube electrode is provided outside the inner tube electrode,
wherein the cylinder apparatus further includes a flow passage formed between the inner tube electrode and the outer tube electrode, the flow passage being configured in such a manner that the functional fluid flows from one axial end side toward the other axial end side due to at least an extension-side movement of the rod,
wherein the flow passage defines a first end region, a second end region, and an intermediate region between the first and second end regions,
wherein the flow passage includes a flow passage cross-sectional area change portion configured such that a cross-sectional area of the flow passage of the intermediate portion of the flow passage is larger than a cross-sectional area of the flow passage of the first end region of the flow passage,
wherein a plurality of seal portions is provided in the flow passage,
wherein the plurality of seal portions includes short partition walls provided in the first end region of the flow passage and a plurality of long partition walls,
wherein the long partition walls are longer than the short partition walls and extend helically continuously from an end of the first end region of the flow passage through at least the intermediate region of the flow passage, and wherein the number of seal portions provided in the intermediate region of the flow passage is less than the number of seal portions provided in the first end region of the flow passage.

7. The cylinder apparatus according to claim 6, wherein each of the long seal portions is inclined at an inconstant angle with respect to an intersection line perpendicular to an axial direction of the electrode inner tube, and includes a sharply inclined portion inclined at a large angle on the first end region of the flow passage.

\* \* \* \* \*